3,605,432
ABSORPTION REFRIGERATING SYSTEM
Masaji Wada, 682 Marukodori 2-chome,
Kawasaki-shi, Kanagawa-ken, Japan
Filed Jan. 23, 1969, Ser. No. 793,485
Claims priority, application Japan, Jan. 26, 1968,
43/4,724; Jan. 29, 1968, 43/5,314
Int. Cl. F25b 15/06
U.S. Cl. 62—324    12 Claims

ABSTRACT OF THE DISCLOSURE

A direct fire type double-effect absorption refrigerating system comprising as its principal component devices an evaporator, an absorber, a generator, a condenser and two solution heat-exchangers and in which a hot water for service forming device is provided in parallel to a refrigerating cycle system or heat pump cycle system and refrigerant gas is directly or indirectly introduced from a generator which is heated from an external heating source or a liquid separator connected to said generator into said hot water forming device thereby to form a condensed refrigerant liquid which is to be recycled to said generator.

BACKGROUND OF THE INVENTION

When hot water for service such as drinking is formed in a conventional absorption refrigerating system, a portion of the heat for heating a room and the like has to be diverted to heat water to be formed into hot water for service only while the refrigerating system is being operated for room heating purpose. However, in such a conventional procedure, the heating capacity of the refrigerating system is inevitably reduced while that portion of the heat generated in the system is being diverted to the formation of the hot water for service and the refrigerating system may not meet both the room heating and the formation of hot water for service purposes simultaneously. And when the refrigerating system is operated for room cooling purpose the system generally can not form hot water for service. If the conventional absorption refrigerating system is operated so as to form hot water for service while the device is operated for room cooling, the system can not be operated with perfect stabilization. In other words, when such a conventional absorption refrigerating system employs salt and the like as absorbent, as the load on the system increases the absorbing solution would easily crystallize, and when the refrigerating system employs glycol and the like as absorbent, the viscosity of the absorbing solution would inevitably increase to an abnormal level and therefore, in either case, the system can not be operated with stabilization. When the conventional refrigerating system is operated so as to form hot water for service while the system is performing room cooling, for example, as shown in FIG. 3, the absorbing solution cycle will be as shown by $a-b-c-d'-e'-a$ and generates refrigerant vapor corresponding to variations in the concentration of the absorbing solution as shown by the line $d-d'$ and the thus generated vapor heats water to be formed into hot water for service. In such a case, the state of the strong solution (having a relatively high absorbing ability) at the inlet of the absorber $e'$ will approach its crystallization line and therefore, there is the possibility of crystallization of the strong solution. Furthermore, since the concentration of the solution at the inlet of the absorber varies depending upon the load for forming hot water for service, the variation in the concentration immediately affects the absorption action of the solution and causes the entire cycle to fluctuate resulting in unstable operation of the refrigerating system. Therefore, the conventional absorption refrigerating system can not be operated for double-effect such as simultaneous room cooling and forming of hot water for service or simultaneous room heating and forming of hot water for service unless a separate device which is exclusively operated for forming hot water for service such as drinking is employed in connection with the refrigerating system.

In order to eliminate the above difficulties, there has been proposed a double-effect absorption refrigerating system in which plural generators are provided and a high temperature refrigerant vapor generated in the first effect generator (this generator will be referred to as "first generator" hereinbelow) is fed to the second effect generator (this generator will be referred to as "second generator" hereinbelow) where the refrigerant vapor is utilized for heating the second generator. But such a conventional refrigerating system is ineffective.

SUMMARY OF THE INVENTION

The present invention relates to an improved and novel direct fire double-effect absorption refrigerating system and more particularly, to a direct fire double-effect absorption refrigerating system which uses both refrigerant and absorbent to perform a refrigerating cycle and which can perform simultaneously a cooling operation and a hot water for service forming operation whereby the cooling efficiency may be improved and the thermal efficiency may be also increased without the need for increasement of heating energy.

The novel direct fire double-effect absorption refrigerating system is adapted to form hot water for service while the refrigerating system is being operated for providing cooled water or air or hot water or air which cooled or hot water or air is to be employed for cooling or heating a room and the like.

One object of the present invention is to provide a direct fire double-effect absorption refrigerating system which can eliminate the disadvantages inherent in the conventional refrigerating system of the types referred to hereinabove.

Another object of the present invention is to provide a direct fire double-effect absorption refrigerating system which can simultaneously perform a room cooling operation and a hot water for service forming operation without the use of any separate device adapted to form hot water for service exclusively or which can simultaneously perform a room heating operation and a hot water for service forming operation without the use of any separate device adapted to form hot water for service exclusively.

Another object of the present invention is to provide a direct fire double-effect absorption refrigerating system which can form hot water for service while the refrigerating system is being operated for cooling or heating a room without causing the concentration of the absorption solution to suddenly rise thereby to ensure safe operation of the refrigerating system.

According to the present invention, there is provided a direct fire double-effect absorption refrigerating system comprising as its principal component devices an evaporator, an absorber, a generator, a condenser and a solution heat exchanger, characterized by that a heater for forming hot water for service is disposed in the recycling circuit of the refrigerant liquid and refrigerant gas is directly or indirectly guided from the generator which is heated from an externally disposed heating source or a liquid separator into the hot water for service forming heater and thereafter, the condensated refrigerant liquid is recycled to the generator.

According to the present invention, there is also provided a direct fire double-effect absorption refrigerating system which comprises as its principal component devices an evaporator, an absorber, a first generator, a second generator, a condenser, a first solution heat exchanger and a second solution heat exchanger, characterized by that a hot water for service forming device is provided in a branch line leading from the refrigerant liquid recycling circuit which leads from the second generator to the condenser and water is heated by the high temperature refrigerant liquid in the hot water for service forming device and after the reduction of the refrigerant liquid through the hot water forming operation, as the cooled refrigerant liquid issues from the hot water forming device and then enters the condenser, the cooling load imposed on the condenser for cooling the refrigerant liquid can be reduced thereby to improve the efficiency of the refrigerating cycle in the refrigerating system.

The terms "strong solution," "intermediate concentration solution" and "weak solution" used herein mean the absorbent solution having the concentration of about 65% by weight, that having the concentration of about 62.5% by weight, and that having the concentration of about 60% by weight, respectively.

The above and other objects and attendant advantages of the present invention will be more readily apparent to those skilled in the art from the following description when read in connection with the accompanying drawings.

PREFERRED EMBODIMENTS OF THE INVENTION

Figure 1:
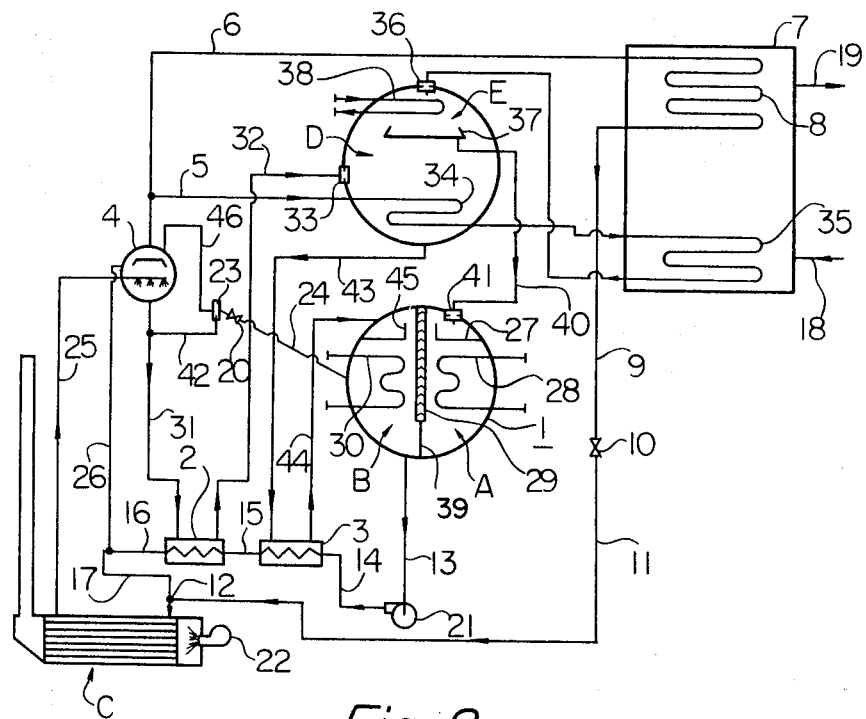
FIG. 1 is a schematic view of the circuit of a preferred form of direct fire double-effect absorption refrigerating system according to the present invention.

The present invention will be now described referring to the accompanying drawings and especially, to FIG. 1 thereof in which a preferred or first form of refrigerating system according to the present invention is schematically shown. The refrigerating system is shown as being a direct fire double-effect absorption refrigerating system. The refrigerating system comprises as its essential component devices an evaporator A, an absorber B, a first effect generator C (this generator will be referred to as "first generator" hereinbelow), a second effect generator D (this generator will be referred to as "second generator" hereinbelow), a condenser E, a first solution heat exchanger 2, a second solution heat exchanger 3 and a liquid separator 4. A main cycle line 5 extends from the solution separator 4 and a separate refrigerant gas line 6 is branched off the main cycle line 5. The branch refrigerant gas line 6 is connected at the other end of one end of the heating coil 8 of a hot water for service forming device within tank 7 and serves as a heater which forms water into hot water for service. Tthe other end of the heating coil 8 is connected to a second refrigerant line 9 which is in turn connected at the other end to a third refrigerant line 11 through a control valve 10 provided between the lines 9 and 11. The third refrigerant line 11 has an extension 12 which may be connected to liquid lines 13, 14, 15, 16 and 17 or may be directly connected to the first generator C. In this case, it is convenient that the heating coil 8 is so disposed that the refrigerant within the coil 8 and line 9 may flow into the first generator C by its own gravity. The control valve 10 is designed to automatically adjust the flow rate of refrigerant liquid depending upon the requirement for a particular service hot water supply load and also to control the heat transfer area by the refrigerant liquid which condenses within the heating coil 8. Alternatively, instead of the control valve 10 being inserted in the system including the refrigerant lines 9 and 11, the control valve 10 may be disposed in the line 6. And if hot water for service supply load is constant, the control valve 10 may be replaced by any suitable conventional manual valve. The refrigerant gas which has been separated from the liquid within the liquid separator 4 is introduced into the hot water for service supply device storage tank 7 where the refrigerant gas is passed through the heating coil 8 to heat water which is supplied through a water supply line 18 which leads from a suitable water supply source (not shown). The heated hot water is then discharged from the system through a hot water exit line 19 to be sent to a place (not shown) where the hot water is utilized for a practical purpose. On the other hand, the refrigerant which has been liquefied within the heating coil 8 is allowed to flow through the refrigerant lines 9 and 11 into the first generator C. By the provision of the refrigerant flow circuit which is exclusively utilized for service hot water supply in parallel to the main circuit for room cooling or heating cycle, the refrigeration system of the present invention can keep stable operation either in a cooling or heating cycle with the capacity thereof not being affected and without any increase in the concentration of the solution. The first generator C is of such type system the heating capacity of which can be controlled depending upon the heating load imposed on the absorption refrigerating system.

Figure 2:
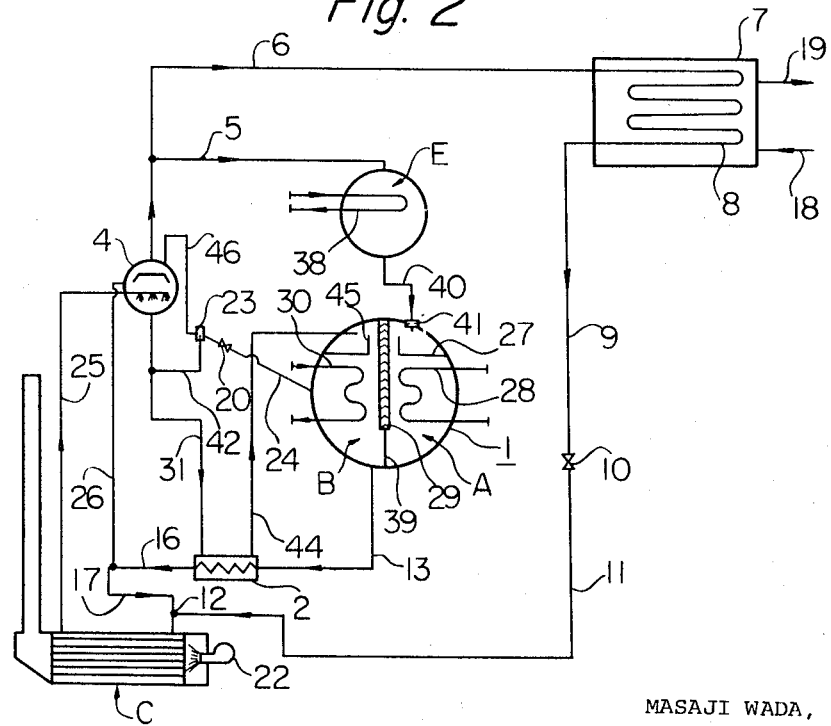
FIG. 2 is a fragmentary schematic view of the circuit of a modified form of refrigerating system according to the present invention.

Referring now to FIG. 2 in which a modified or second form of refrigerating system according to the present invention is illustrated and this refrigerating system is of a simple effect absorption system. The modified refrigerating system is basically the same as the preferred form of system shown in FIG. 1, but the modified refrigerating system has eliminated therefrom the second solution heat exchanger 3 and second generator D shown in FIG. 1. The modified refrigerator comprises as its essential component devices an evaporator A, an absorber B, a generator C, a condenser E and a liquid separator 4. A main cycle line 5 leads from the liquid separator 4 and a separate refrigerant gas line 6 is branched off the main cycle line 5. The separator refrigerant gas line 6 is connected to the heating coil 8 of a service hot water storage tank 7 which also serves as a heater forming hot water. Refrigerant lines 9 and 11 are connected to the hot water storage tank 7 and a control valve 10 is provided at an intermediate point in the circuit comprising the lines 9 and 11. The refrigerant line 11 has an extension 12 which may be connected to liquid lines 13, 16 and 17 or may be directly connected to the generator C. In this case, the refrigerant gas which has been separated from the liquid component in the liquid separator 4 is guided into the heating coil 8 of the hot water storage tank 7 and the condensed refrigerant liquid is introduced to the generator C at a controlled rate through the flow control valve 10 in the same manner as described in connection with the preferred form of refrigerator of FIG. 1.

In FIGS. 1 and 2, reference numeral 1 designates a cylindrical drum which comprises the evaporator A, an absorber B to which one end of a line 24 is connected and the other end of the line is connected to a short pipe 23. A valve 20 is provided in the line 24. A solution pump 21 (which is eliminated from the refrigerator of FIG. 2) is connected at the opposite sides to the solution lines 13 and 14. A burner 22 is provided in the generator C which is referred to as "the first generator" in the embodiment of FIG. 1. Lines 25 and 26 are connected at one end to the generator C and line 16 respectively and the other ends of the lines 25 and 26 are connected to the liquid separator 4. A perforated spray pan 27, an evaporator coil 28, an eliminator 29 and an absorber coil 30 are provided in the cylindrical drum 1. A conduit 31 is connected between the first solution heat exchanger 2 (which is referred to as the "the solution heat exchanger" in the embodiment of FIG. 2) and liquid separator 4. Throttling mechanisms 33 and 36 are provided in the second generator D (these mechanisms and second generator are eliminated from the refrigerator of FIG. 2). Also provided in the second generator D is a coil 34 which is eliminated from the embodiment of FIG. 2. The above-mentioned hot water supply heater and storage tank 7 (FIG. 1) is provided with a second coil 35. A perforated spray pan 37 and a condenser coil 38 (which are eliminated from the embodiment of FIG. 2) are provided in the second generator D. The interior of the cylindrical drum 1 is divided into two halves or the evaporator and absorber sections by a partition wall 39. A line 40 is connected between the condenser E and cylindrical drum 1. A conduit 42 is connected between the liquid separator 4 and short tube 23. A line 43 (which is eliminated from embodiment of FIG. 2) is connected between the second generator D and second solution heat exchanger 3 (which is eliminated from the refrigerator of FIG. 2). A line 44 is connected between the second solution heat exchanger 3 and cylindrical drum 1 and a line 46 is connected between the liquid separator 4 and short tube 23. The evaporator A is provided with a throttling mechanism 41 and the absorber B is provided with a perforated liquid spray pan 45.

The refrigerating operation cycle of the direct fire double-effect absorption refrigerating system of FIG. 1 in which lithium bromide is used as absorbent will be described. Prior to the initiation of the operation on the refrigerating system, the valve 20 is fully closed and maintained in the fully closed position. When the refrigerating system is operated for a room heating cycle, this valve 20 is fully opened. The valve 20 is usually manually manipulated for either a room cooling or heating cycle, but if necessary or desired, the valve may be automatically and remotely manipulated by either electric or pneumatic means (not shown) which may specifically be actuated by a push button (not shown). With the valve 20 maintained in the fully closed position, then the solution pump 21 is actuated and the burner 22 associated with the first generator C is ignited. The weak solution pumped by the pump 21 continues to rise through the line 25 to the liquid separator 4 until the pressure within the liquid separator 4 rises and the pressure difference causes the solution to recycle whereupon the solution overflows to pass through the lines 26 and 17 down into the first generator C by gravity.

When the level of the solution within the liquid separator 4 reaches a value in excess of the overflow point at which the solution passes over the lines 26 and 17, the level of the solution within the absorber B decreases correspondingly and the solution pump 21 can no longer pump up the solution due to the so-called cavitation phenomenon and maintains the solution therein in a sealing state by mere pressure because the pump 21 has been previously filled with absorbent and refrigerant liquid so that the cavitation phenomenon would occur in the pump when the solution level within the absorber B has decreased to a predetermined level. Meanwhile, the solution standing within the generator C is heated by the burner 22 and the solution has refrigerant vapor or bubbles therein. In this case, the line 25 serves as a bubble pipe and both the refrigerant liquid and vapor rise up into the liquid separator 4.

While the weak solution is recycling through the first generator C and liquid separator 4, the temperature of the weak solution rises and the solution is divided into the refrigerant liquid and vapor in the liquid separator. Thus, the liquid separator 4, lines 6 and 5, second generator D and heating coil 34 are filled with the thus separated refrigerant vapor and the vapor pressure rises. This is due to the fact that the pressure of the vapor which is successively generated increases because no solution is present in the second generator D and on the outside of the heating coil 34. When this phenomenon occurs the magnitude of difference between the low pressure within the second generator and the high pressure within the liquid separator 4 increases and overcomes the liquid sealing action on the solution which was standing in the first heat exchanger and lines 31 and 32 during the inoperative period of the refrigerating system. Accordingly, the solution from the liquid separator 4 which is being condensed little by little is allowed to flow through line 31, first heat exchanger 2, line 32 and throttling mechanism 33 into the second generator D. When the solution begins to flow from the second generator D through the line 43, second heat exchanger 3 and line 44 into the absorber B, the cavitation phenomenon in the solution pump 21 disappears to resume the normal pumping operation of the pump whereby the refrigerating system operates for both a cooling cycle and hot water for service supplying. During the above-mentioned double effect operation of the refrigerating system, the level of the solution which was overflowing through the lines 26 and 17 into the liquid separator declines due to the rising of the pressure on the solution and the solution ceases to overflow. The refrigerant in the perforated spray pan 27 in the upper portion of the evaporator A in the cylindrical drum 1 is sprayed over the evaporator coil 28 and evaporates by absorbing the heat of the cool water which is flowing within the coil 28 while the heat extracted water is cooled. The refrigerant vapor which has evaporated within the evaporator A is transferred to the absorber B after the vapor has had water drops removed therefrom by the eliminator 29 and absorbed into the strong solution within the absorber B. The absorber B contains the absorber coil 30 through which cooling water is flowing and the cooling water cools the absorption heat which has been generated within the absorber B so that the refrigerant gas maintains its absorption capability with respect to the strong solution. The solution which was diluted by its absorption of the refrigerant vapor is pressurized by the weak solution pump 21 and forced through the second solution heat exchanger 3 and first solution heat exchanger 2 into the first generator C where the solution is heated by the burner 22. Then the heated solution is caused to again rise up in a mixture flow of gas and liquid form through the line 25 to the liquid separator 4 where the mixture is divided into refrigerant gas and intermediate concentration solution. The intermediate concentration solution flows down the line 31 to the first heat exchanger 2 where the solution performs heat-exchange with the weak solution and then flows through the line 32 and throttling mechanism 33 into the second generator D. On the other hand, the refrigerant gas which has been separated by the liquid separator 4 is guided through the line 5 into the coil 34 of the second generator D and heats the intermediate concentration solution which is reserved in the outside space of the coil 34 to generate refrigerant vapor and condenses within the coil 34 to become refrigerant drain. The refrigerant drain or liquid is introduced into the coil 35 of the hot water supply and storage tank 7 where the heat thereof is transferred to the water and then flows through the throttling mechanism 36 to be collected in the perforated spray pan 37 in the condenser E. Thus, the efficiency of the cooling cycle may be improved while imparting the water to be formed into service hot water with heat energy. On the other hand, the refrigerant vapor generated in the second generator D is introduced into the condenser E which is provided in the same cylindrical drum as the second generator D and the refrigerant vapor is cooled and condensated by the cooling water which is flowing within the condenser coil 38. Thereafter, the condensated refrigerant is collected in the perforated spray pan 37. And the refrigerant liquid within the refrigerant perforate spray pan 37 is guided through the line 40 and throttling mechanism 41 into the perforated spray pan 27 positioned in the upper portion of the evaporator A and sprayed over the evaporator coil 28. On the other hand, the solution which has generated the refrigerant vapor and become a strong solution in the second generator D flows through the line 43 and second solution heat exchanger 3 where the solution heat-exchanges with the weak solution and then flows through the line 44 to the perforated spray pan 45 of the absorber B and sprayed over the exterior of the absorber coil 30 to be cooled whereby the absorption ability of the refrigerant vapor in the solution is increased. The solution which has the increased vapor absorbing ability absorbs the refrigerant vapor therein to repeat a next cycle. When a demand for service hot water supply arises, with the refrigerating system maintained in the conditions for the above-mentioned cycle, the refrigerant liquid which has been previously present in the heating coil 8 of the hot water supply and storage tank 7 and line 9 is caused to flow at a rate controlled by the control valve 10 in accordance with the demand for service hot water load into the first generator C where the solution is heated to become a refrigerant vapor. The thus generated refrigerant vapor is supplied from the first generator C through the line 6 into the heating coil 8 of the tank 7 where the refrigerant vapor is caused to transfer its heat to the refrigerant liquid through the heat transfer area which has been now expanded due to the flowing of the refrigerant liquid into the coil 8 thereby to easily provide service hot water supply. As the hot water supply load on the refrigerating system decreases, the refrigerant liquid which has been condensed within the heating coil 8 fills up the inside of the heating coil 8 and reduces the heat transfer area. In other words, the refrigerant liquid is guided into the first generator C in response to the hot water supply load and heated there to generate refrigerant gas which is to be again recovered into the heating coil 8 and line 9 where the refrigerant flows to be used for a next cycle operation.

When the refrigerating system is operated for a combined room heating and hot water supply cycle or an exclusive hot water supply cycle, the flow of the cooling water through the absorber coil 30 and condenser coil 38 is blocked off and then the valve 20 is opened. Then, the weak solution is caused to flow down by itself through a space in the solution pump 21 without operating the pump. In this cycle, the second generator D and condenser E will not contribute to the cycle. In this cycle, when the burner 22 is ignited the weak solution within the first generator C forms a mixture in cooperation with the refrigerant gas and the mixture rises up the line 25 to the liquid separator 4 where the mixture is divided into refrigerant gas and strong solution. The thus separated refrigerant gas flows from the separator 4 through the lines 46 to the short tube 23 and the strong solution also flows from the separator 4 through the line 42 to the short tube 23 to merge into the gas. The merged flow then passes through the valve 20 and line 24 into the absorber B from where the refrigerant gas further flows through the eliminator 29 into the evaporator A where the refrigerant gas heats the warm water for heating purpose to an elevated temperature. On the other hand, the refrigerant vapor which has been deprived of heat and condenses on the exterior of the evaporator coil 28 drops down into the lower portion of the evaporator A to accumulate where and when the dripping refrigerant reaches a predetermined level the refrigerant overflows the partition wall 39 into the absorber B to dilute the strong solution to form a weak solution. The weak solution in the absorber B is supplied into the first generator C by the natural flowing down fashion due to a liquid column where the weak solution is preserved for a next cycle. When a load of hot water supply arises, and when valve 20 is opened with the refrigerator maintained in the conditions for the above-mentioned cycle, the refrigerant liquid which is then present in the heating coil 8 of the hot water supply and storage tank 7 and the line 9 is caused to flow into the first generator C at a rate controlled by the control valve 10 in response to the demand for hot water supply load and heated there to become a refrigerant gas. The refrigerant gas is supplied through the line 6 into the heating coil, where the refrigerant gas is condensed by giving its own latent heat to the water which is being supplied into the tank 7.

Thus, the water issuing from the outlet 19 is at a very high temperature as hot water. As the load of hot water supply decreases, the refrigerant condenses within the heating coil 8 to fill the same up thereby to reduce the heat transfer area. In short, the cycle is performed by repeating the operation whereby the refrigerant liquid first flows into the first generator C and then recovered into the heating coil 8 and line 9.

The refrigerator shown in FIG. 2 is also operated for the same cycles as described in connection with the first form of refrigerator hereinabove.

Figure 3:
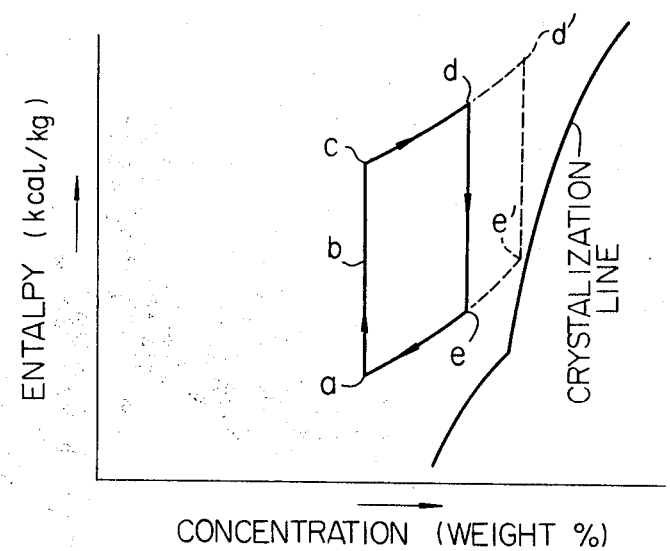
FIG. 3 is a characteristic diagram showing the relationship between the enthalpy and concentration in a conventional refrigerating system.
Figure 4:
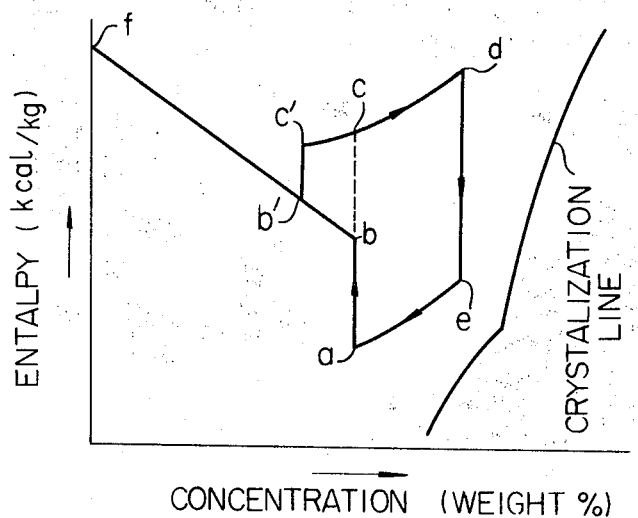
FIG. 4 is a characteristic diagram showing the relationship between the enthalpy and concentration in the refrigerating systems of the present invention.

The manner in which any of the two forms of direct fire double-effect absorption refrigerating systems is operated for providing hot water to meet a demand for a supply of hot water for service while the system is being operated for cooling purpose will be described in connection with a simple cycle referring to the enthalpy-concentration diagrams of the refrigerant-absorbent solution as shown in FIGS. 3 and 4. In FIGS. 3 and 4, the cycle $a-b-c-d-e-a$ is a diagram of the absorption process of the solution cycle obtained when the refrigerating system was operated for a cooling cycle, the line $a-e$ is a constant pressure line, and the point $b$ represents a state at the exit of the solution heat exchanger. In a conventional single effect absorption system, when a hot water is to be provided while the refrigerator is operated for a cooling cycle, as shown in FIG. 3, the concentration cycle will become as shown with the $a-b-c-d'-e'-a$ and generates refrigerant vapor corresponding to variation in the concentration of the solution as represented by the line $d-d'$ and heats water for a supply of hot water. In this case, since the $e'$ at the inlet of the absorber for strong solution will approach the crystallization line, there is the possibility of crystallization of the strong solution. And since the concentration of the solution at the inlet of the absorber varies corresponding to a load of hot water supply, the variation of the solution concentration soon affects upon the absorption capacity of the solution and renders the whole cycle unstable. On the other hand, when a hot water is provided while the single effect absorption system is operated for a cooling cycle, as shown in FIG. 4 there will be no variation in the concentration of the strong solution and there is no possibility for variation in the concentration of the thick strong solution resulting in disadvantage as crystallization of the strong solution. Since the state $e$ of the solution at the inlet of the absorber will not change, the absorption capacity of the solution will not be adversely affected thereby to ensure a safe operation for the refrigerating system. FIG. 4 illustrates a case in which the refrigerant liquid condensed in a hot water forming device is supplied at the exit of the solution heat exchanger and the state $b$ of the solution at the exit of the solution heat exchanger and the state $f$ of the refrigerant liquid combine to provide the state $b'$.

The embodiments of refrigerating systems shown in FIGS. 5–11 are suitably employed when the demand for hot water for service is relatively small.

Figure 5:
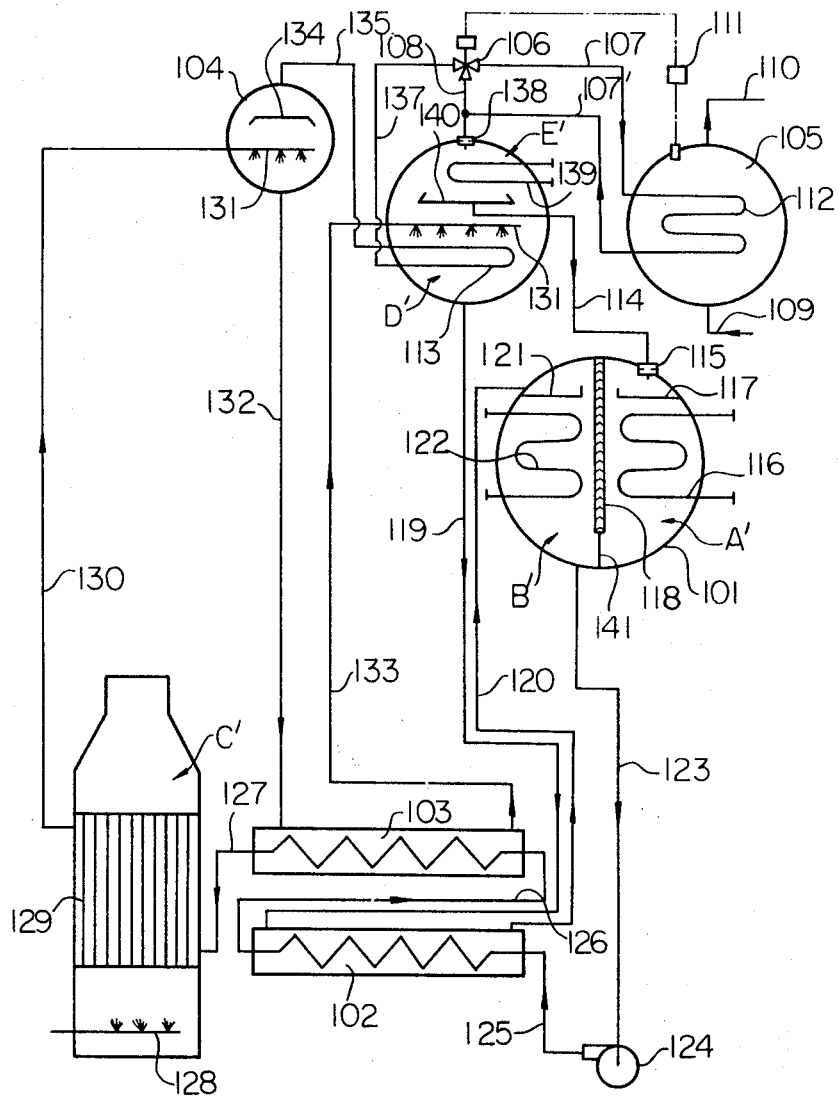
FIG. 5 is a schematic view of the circuit of a third form of refrigerating system according to the present invention.
Figure 6:
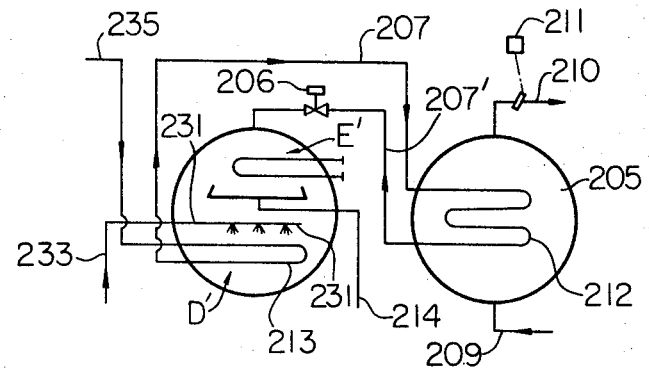
FIG. 6 is a fragmentary schematic view of the circuit of a fourth form of refrigerating system according to the present invention.

FIG. 5 illustrates a further modified or third form of direct fire double-effect absorption refrigerating system according to the present invention and this refrigerating system also comprises as its essential component devices an evaporator $A'$, an absorber $B'$, a first generator $C'$, a second generator $D'$, a condenser $E'$, a first solution heat exchanger 103, a second solution heat exchanger 102, and a liquid separator 104. A refrigerant recycling circuit 108 leads from the second generator $D'$ and is connected to the codenser $E'$. A three way control valve 106 is provided in the recycling circuit 108 and a line 107 is connected through the three way control valve 106 to the recycling circuit 108. The other end of the line 107 is connected to a hot water supply device 105. The high temperature refrigerant liquid from the second generator $D'$ is guided into the hot water supply device 105 where the refrigerant liquid is caused to heat exchange with the relatively low temperature water is guided into the heating tube 112 in the hot water device 105 through the line 109 which is connected at one end to the device 105 while the other end of which is connected to a suitable water supply source (not shown). Through the heat exchanging, the refrigerant liquid is cooled by the water and the thus cooled refrigerant liquid flows through a line 107' connected at the opposite ends to the recycling circuit 108 and to the heating coil 112 of the hot water supply device 105 into the condenser E. On the other hand, the water which has been heated through the heat exchanging with the high temperature refrigerant liquid is discharged from the hot water supply device 105 through a line 110, which is connected at one end to the device 105 and at the other end to a suitable hot water service means (not shown), to the hot water service means. It is, of course, possible to design so that the hot water supply device 105 may hold a predetermined amount of hot water as desired depending upon a particular application to which hot water supply is used. In order to control the flow rate of the refrigerant to be guided to the hot water supply device 105, a suitable temperature detection means 111 may be provided in the system leading from the three-way control valve 106 to the hot water supply device and the temperature detection means is adapted to send a signal in response to the flow rate of the refrigerant liquid passing through the line to the three-way control valve 106 whereby hot water at a desired suitable temperature can be automatically provided. Alternatively, the illustrated three-way control valve 106 may be replaced by two two-way control valves or three-way control valves, manual valves and so on. Furthermore, the temperature detection means 111 may be provided in the line 110 which is in communication with the exit of the hot water supply device 105. When the hot water supply capacity of the single hot water forming device 105 is insufficient to meet the demand for hot water supply, as shown in FIG. 6, the hot water forming device 205 may be disposed in the refrigerant recycling system 207 and 207' leading from the second generator $D'$ the condenser $E'$ and the refrigerant at a relatively high temperature is passed through the tube 212 and cause to heat-exchange with the water introduced into the hot water forming device 205 through the line 209. The thus heat-exchanged and cooled refrigerant flows through the control valve 206 into the condenser $E'$. In such a case, the temperature control adjusting valve 211 provided in the hot water exit line 210 serves to open or close the valve 206, but even closed the control adjusting valve 206 is so designed that the flow control valve 206 will not be fully closed and allows the refrigerant liquid to pass through the valve at a predetermined controlled rate.

Accordingly, when the load for hot water supply on the hot water forming device 205 increases to such an amount which can not be obtained at the predetermined recycling rate of refrigerant liquid, the control 206 valve opens to allow the refrigerant to flow at an increased rate to meet such an increased load for hot water supply. In such a case, all of the refrigerant vapor at a high temperature within the tube 212 will not condensate, but the refrigerant may contain some vapor therein and the vapor-containing refrigerant flows into the heating tube 212 of the hot water forming device 205 and accordingly, the condensating latent heat of the vapor component of the liquid-gas mixture refrigerant can be also utilized for heating purpose thereby to obtain hot water having a predetermined or desired temperature. In this case, the heating ability of the second generator $D'$ may be reduced, but the decrease in refrigerating capacity may be prevented if the heating capacity of the first generator $C'$ is correspondingly increased.

Figure 7:
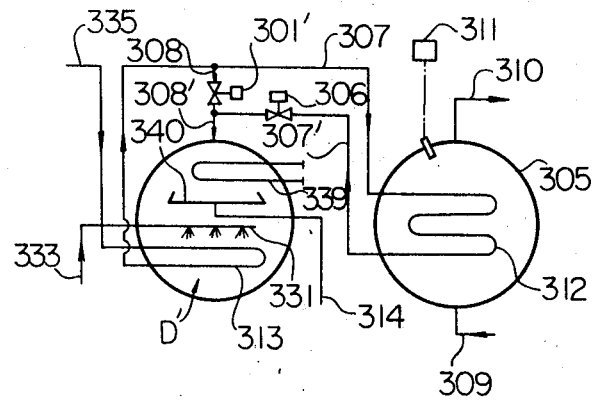
FIG. 7 is a fragmentary schematic view of the circuit of a fifth form of refrigerating system according to the present invention.
Figure 8:
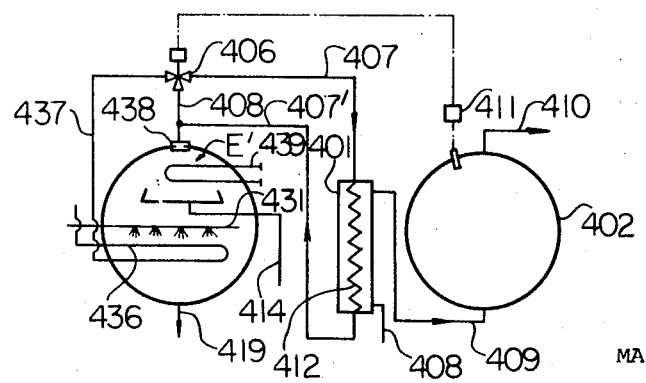
FIG. 8 is a fragmentary schematic view of the circuit of a sixth form of refrigerating system according to the present invention.

FIG. 7 shows an embodiment in which the single three-way control valve 106 of the embodiment in FIG. 5 is replaced by two two-way control valves 306 and 306'. In the embodiment of FIG. 8, the hot water forming device shown in the preceding embodiments is replaced by a modified hot water forming device which comprises two separate sections, that is, a hot water supply section 401 and a hot water storage tank section 402. The hot water supply section 401 is adapted to be supplied with water from a suitable water supply source (not shown) through a line 408 which is connected between the heating section 401 and water supply source and a heating tube 412 is disposed within the heating section 401 into which refrigerant at a high temperature is introduced through a line 407 leading to the hot water supply section 401 thereby to heat the water in the heating section 401 so as to form hot water. The thus formed hot water is introduced through a line 409 connected between the heating section 401 and storage tank 402 into the tank where the hot water is stored. When a demand for the hot water arises, the hot water is discharged from the tank 402 through an exit line 410 leading from the tank 402 to a suitable means (not shown) which uses the hot water for any practical purpose. Also in this modified embodiment, as described in connection with the embodiments of FIGS. 5 to 7 inclusive, a temperature detection means 411 may be provided in the circuit leading from the absorber $E'$ to the hot water forming and storage device 405 for the same purpose as described hereinabove in connection with the embodiments of FIGS. 5 to 7 inclusive.

Figure 9:
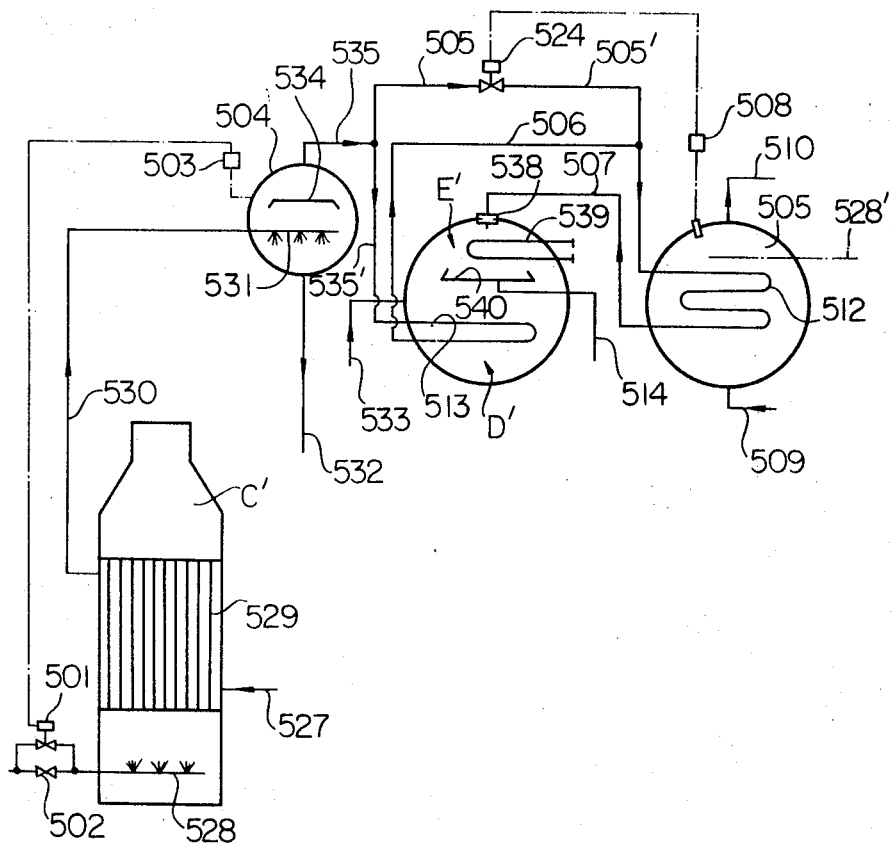
FIG. 9 is a schematic view of the circuit of a seventh form of refrigerating system according to the present invention.
Figure 11:
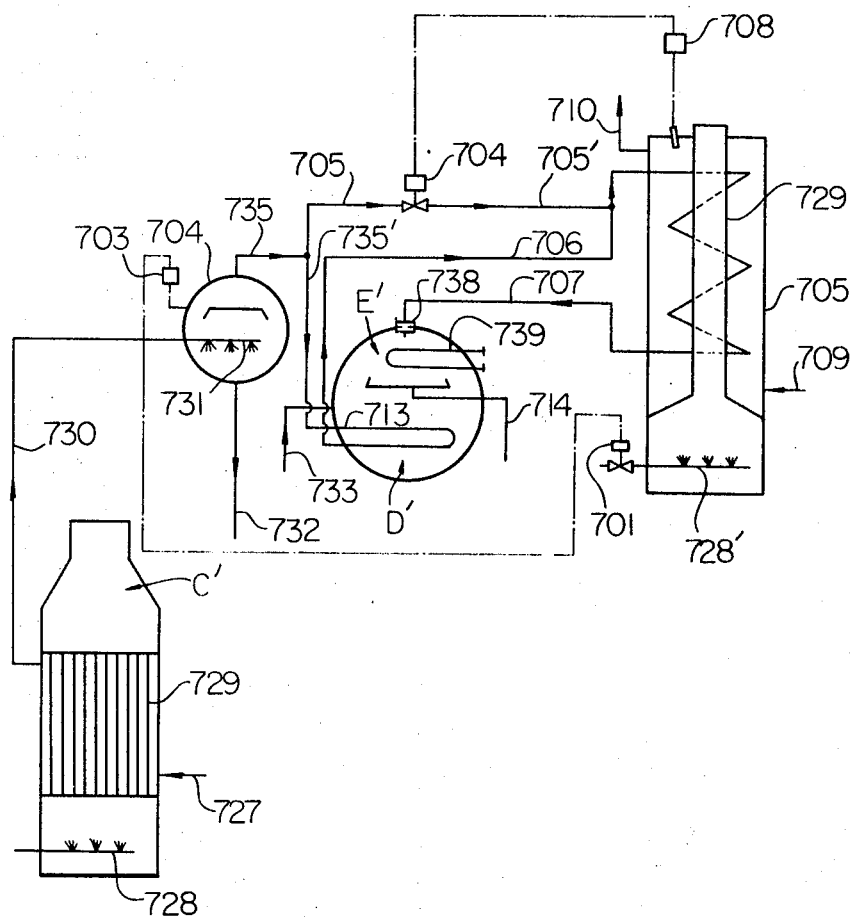
FIG. 11 is a schematic view of the circuit of a ninth form of a refrigerating system according to the present invention.

In the embodiment of FIG. 9, the refrigerant vapor at a high temperature from the liquid separation device 504 flows through 535 and 535' into the heating tube 513 of the second generator $D'$ where the high temperature refrigerant vapor is deprived of its heat through the heating of an intermediate concentration solution present therein and is liquefied. The liquefied refrigerant then flows through a line 506 into a hot water forming device 505 where the refrigerant heats water which flows into the device 505 through a water supply line 509 which is connected between the hot water forming device 505 and a suitable water supply source (not shown). The thus formed hot water is stored within the device 505. In this case, when no demand for the hot water arises, the temperature within the hot water forming device 505 is maintained at that of the cooled refrigerant within the heating tube 512. Accordingly, if the temperature of the hot water maintained at the temperature of the refrigerant is sufficient for the purpose for which the hot water will be practically used, the control valve as described in connection with the embodiments of FIGS. 5 to 8 inclusive may be eliminated. When the degree of the temperature of hot water called for is high sufficient to exceed the heating capacity of the high temperature refrigerant only or when the temperature of the hot water within the tank 505 or in the exit line 510 decreases, a thermostat 508 may be provided in the circuit leading to hot water forming device 505 and a two-way control valve 524 positioned between bypass lines 505 and 505' will automatically open so as to pass the refrigerant vapor directly to the heating tube 512 of the hot water forming device 505. In such a case, when the refrigeration load cycle is great, the double functions of the refrigeration cycle is partially lost and accordingly, the refrigeration capacity will decrease. In such case, there may be present various abnormal conditions such as decrease in the pressure within the liquid separator 504 and rise in the temperature at the cool water exit, for example. However, in order to eliminate such difficulties, according to the present invention, the pressure within the liquid separator 504 is detected by a pressure switch provided in the circuit leading from the liquid separator 504 and the feed rate of fuel to the burner 528 is increased by opening a bypass valve provided in the circuit in which the pressure switch is provided adjacent to the burner 528 whereby hot water may be formed without causing the refrigeration to decrease. As mentioned above, since the increase in the heating capacity of the generator can be detected at various points, it is convenient to utilize these detected values effectively so that the heating capacity of the generator may be easily increased. And an auxiliary burner 528' may also be provided in the hot water forming device 505 so that the heating capacity of the device 505 may be increased depending upon the amount of hot water to be formed therein. For example, as shown in FIG. 11, an auxiliary burner 728' and an additional heating and heat transfer tube 729 may be provided in a hot water forming device 705. In such a case, a pressure switch 703 provided in the circuit leading from the liquid separator 704 is adapted to send a signal in response to the pressure within the separator to an automatic control valve 701 to actuate the valve. When actuated in the manner mentioned just above, the auxiliary burner 728' is ignited to heat the water so as to meet the increased demand for hot water.

Figure 10:
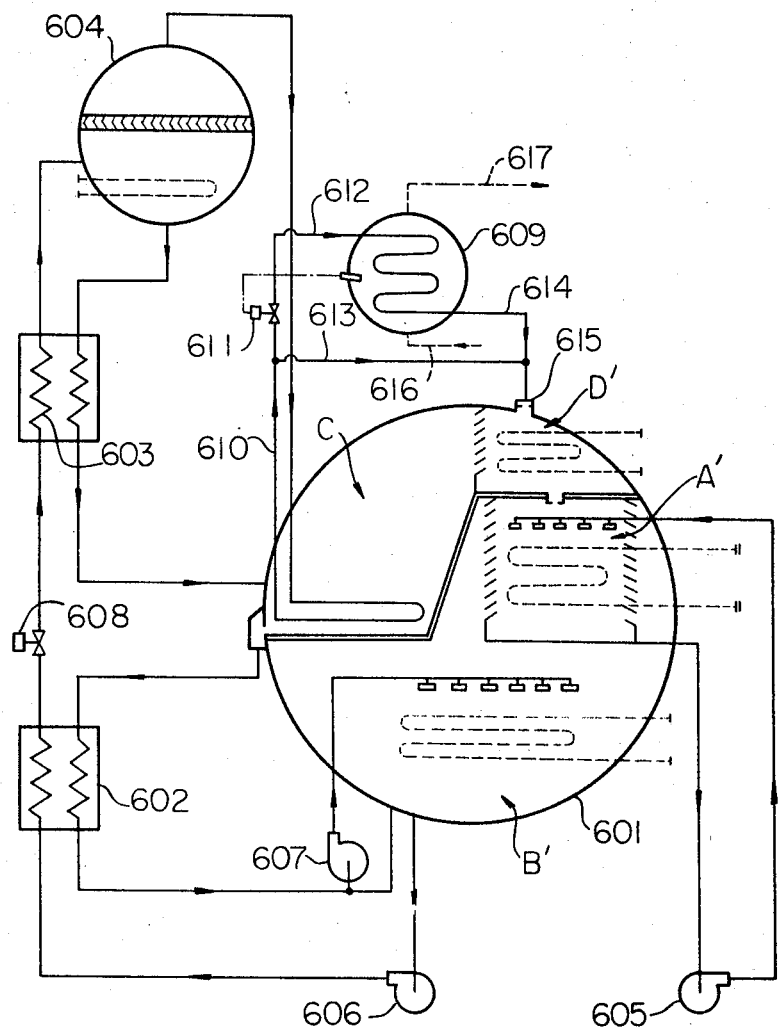
FIG. 10 is a schematic view of the circuit of an eighth form of refrigerating system according to the present invention.

FIG. 10 shows an embodiment of direct fire double-effect absorption refrigerating system in which vapor or hot water is employed as heating medium. In the embodiment of this figure, an evaporator A, an absorber B, a second generator C' and a condenser D' are housed in a single cylindrical drum 601. The refrigerating system of FIG. 10 comprises as other essential component devices a second solution heat exchanger 702, a third solution heat exchanger 703, a first generator 704, an evaporator pump 705, a generator pump 706, an absorber pump 707, a solution flow control valve 708 and a hot water forming device 709. The hot water forming device 709 is supplied with refrigerant liquid through a line 410, a two-way control valve 411 and a line 412 while water to be heated is supplied through a line 417 which is connected to a water supply source (not shown). The water is heated in the hot water forming device 609 through a heat-exchanging with the refrigerant and the thus formed hot water is guided through an exit line 417 to a suitable place where the hot water is utilized for a practical purpose. On the other hand, the cooled refrigerant which has been deprived of its heat through the heat-exchanging with the water in the hot water forming device 609 flows from the device through a line 714 and a throttling mechanism 715 into the condenser D'. Reference numeral 713 designates a bypass valve which is adapted to be utilized when the hot water forming device 709 is not requested to form hot water. The operation of the embodiment of FIG. 10 is substantially the same as the preceding embodiments.

Referring to FIG. 5 again in which the refrigerating system is shown as a direct-fire double-effect absorption refrigerating system which employs a direct fire type generator C'. The evaporator A' and absorber B' are housed on the right and left hands in the single cylindrical drum 101. In the evaporator A', the refrigerant liquid is supplied from the condenser E' through the line 114 and throtting mechanism 115 into the perforated spray pan 117 and portion of the refrigerant liquid sprayed by the pan 117 is deprived of its heat by the water flowing through the heating tube 116 and evaporates and the remaining portion of the refrigerant liquid falls onto the bottom of the evaporator to be held there.

And the refrigerant vapor formed by the evaporation of the refrigerant liquid within the evaporator A' is separated from the liquid drops by the eliminator 118 and only the vapor component is guided into the absorber B from where the vapor is sprayed over the absorber tube 122 by the perforated spray pan 121. The strong solution sprayed over the absorber tube 122 is cooled by the water which flows through the tube 122 and imparted a strong absorption power thereto which can absorb the cool refrigerant vapor which has been formed through the vaporization of the refrigerant liquid and becomes a weak solution. The absorbent solution which has been rendered into a weak solution by its absorption of the refrigerant vapor is guided from the lower portion of the absorber B' through the line 123 into the second solution heat exchanger 102 where the weak solution is heated through its heat-exchanging with a relatively high temperature strong solution from the second heat exchanger 102. The thus heated solution flows from the second generator D' through the line 126 to the first solution heat exchanger 103 where the heated solution is further caused to heat-exchange with a higher temperature intermediate concentration solution to be heated to a further elevated temperature and finally issues into the line 127. The absorbent solution pre-heated to such a high temperature then enters the first generator C' where the absorbent solution is heated to its boiling point by a high temperature vapor which has been introduced onto and surrounding the generator tube 129 after the generation of the vapor by a suitable combustion device such as a gas burner 128 or any other oil burner, for example.

The absorbent solution-containing vapor is then guided through the line 130 to the liquid separator 104 where the absorbent solution is sprayed through the spray tube 131 and divided into the refrigerant vapor component and a relatively strong solution (an intermediate concentration). The intermediate concentration solution flows from the separator 104 through the line 132 leading from the bottom of the separator into the first solution heat-exchanger where the solution is caused to heat-exchange with a relatively low temperature solution and cooled thereby and then flows through the line 133 into the second generator D'. In the second generator D', the intermediate concentration solution is separated from the relatively low temperature solution by the liquid separator 104 and perfectly removed its liquid component therefrom by the solution dripping separator plate 134. Since the high temperature refrigerant vapor which has been perfectly removed its liquid component by the liquid separator plate 134 is introduced into the second generator tube 113, the intermediate concentration solution is heated and condensed by the refrigerant vapor. The condensed solution (the strong solution) is guided from the bottom of the second generator D' through the line 119 into the second solution heat exchanger 102 where the strong solution is caused to heat-exchange with and cooled by the low temperature weak solution and returns through the line 120 into the absorber by the gravity and pressure difference and again sprayed over the absorption tube 122 by the perforated spray pan 121 for a next cycle.

On the other hand, the high temperature refrigerant vapor which has been introduced into the second generator tube 113 is caused to dissipate its heat through the heat-exchanging when the intermediate concentration solution is heated and the intermediate concentration solution is introduced through the line 137 and three-way control valve (the valve may be of "on"-"off" type) 106 and line 108 into the throttling mechanism 138.

As mentioned hereinabove, when a demand for hot water is loaded on the refrigerating system, the thermostat 11 responds to the load and sends a signal to the three-way control valve 106 which in turn allows a portion or all of the refrigerant liquid flow into the hot water forming device 105 in which the refrigerant is employed as the heating medium to heat the water which is being introduced into the device 105 and the thus cooled refrigerant is returned from the hot water forming device through the line 107', the line 108 and throttling mechanism 138 to the condenser E' where the refrigerant vapor which has been generated is being introduced and the vapor and the flash vapor from the above-mentioned refrigerant liquid are condensed by heat-exchanging with the cooling water flowing through the tube 139. The condensed refrigerant vapor and flash vapor remain in the lower spray pan 140. The refrigerant liquid is then returned from the pan 140, through the line 114 and throttling mechanism 115 into the evaporator A' to repeat a refrigerant recycle operation. The partition wall 141 in the cylindrical drum 101 divides the interior of the drum into the absorber section B' and evaporator section A' and also serves to introduce the refrigerant liquid at the bottom of the evaporator A' into the lower portion of the absorber section B' by over-flowing so that a cooling load may be substantially reduced and the absorbent solution may be substantially condensed.

As mentioned above, according to the present invention, a heater for heating water into hot water for service is provided in the refrigerant liquid recycling circuit and the refrigerant gas is directly or indirectly guided from an externally heated device such as a generator or a solution separator into the above-mentioned hot water forming heater. The thus condensed refrigerant liquid is recycled to the generator whereby the refrigerating system can be operated for simultaneous room cooling or heating and hot water for service forming. The operation of the refrigerating system for such double-effect purpose can be automatically performed without affecting on the principal operation function for room cooling or heating with stabilization. And since the generator for the absorption refrigerating cycle can be also utilized for the hot water for service forming operation, any specific hot water boiler is not necesary for the hot water for service forming operation whereby the space for the refrigerating system for such double-effect operation can be reduced. Furthermore, since the novel refrigerating system is easy in operation, small in size and less expensive, the system can be also used as a domestic device. Even when embodiments which are provided with a plurality of generators are operated for only a room cooling cycle, such systems can be economically used through the full utilization of the high thermal efficiency. Even they are operated so as to form hot water for service while they are performing a room cooling cycle, the temperature of the absorbent solution may be effectively prevented from rising thereby to ensure stabilized operation. In addition, the refrigerating systems can be continuously operated for forming hot water for service at any desired rate for a room heating cycle to meet both the demands for room heating and forming of hot water for service. And the refrigerating systems do not require any separate device for such double-effect operation and have a wide utility thereby to attain the saving in installation expense. And since heat amount which otherwise has to be wasted can be effectively utilized, saving in the operation expense can be greatly enhanced.

As to the embodiments shown in FIGS. 5 to 11 inclusive, which comprises as their principal components devices an evaporator, an absorber, a first generator, a second generator, a condenser and a solution heat exchanger, by the provision of a simple device for service hot water forming to such double-effect absorption refrigerating systems, the systems can form hot water for service while they are operated for room cooling and the heat energy of the high temperature refrigerant which would be otherwise wasted can be effectively utilized. When water and lithium bromide are employed as refrigerant and absorbent liquid, respectively, the temperature of the refrigerant liquid at the time as the same issues from the second generator is about 110° C. and the flow rate of the refrigerant is $7l/h$ per ton of refrigeration. When any of the above-mentioned embodiments is provided with the hot water for service forming device, the hot water for service can be formed in a great amount and since the relatively high temperature refrigerant liquid which enters the generator has been previously deprived of its heat in the heating tube, the condensation load to be imposed on the condenser due to the flash therein can be almost eliminated and the condensation capacity of the condenser will be greatly increased as compared with the conventional condenser having the same heat transfer capacity whereby the condensation pressure and accordingly, the condensation temperature will be reduced and the heating efficiency as well as the cooling efficiency can be easily increased. And the refrigerating systems can form hot water for service while the system is operated in a room heating or cooling cycle without the necessity for any other heating energy.

While several preferred embodiments of the invention have been shown and described in detail it will be understood that they are for illustration purpose only and are not to be taken as a definition of the invention, reference being had for this purpose to the appended claims.

What is claimed is:

1. An absorption refrigerating system comprising an evaporator, an absorber, a generator having an external heating source, a condenser, a heat exchanger, a separator, said elements being joined to form a refrigeration circuit, means for heating water including a tank filled with water to be heated and a heating coil within said tank, a first line connecting said separator with one end of said heating coil, and a second line connecting the other end of said heating coil with said generator, whereby refrigerant vapor is guided from said separator through said first line to said heating coil to heat said water, thus becomes refrigerant liquid and then flows through said second line to said generator.

2. An absorption refrigerating system according to claim 1, further comprising a second generator and a second heat exchanger in said refrigeration circuit.

3. An absorption refrigerating system according to claim 2, further comprising a valve in said second line for controlling the flow of said refrigerant liquid to said generator.

4. An absorption refrigerating system according to claim 2, further comprising a circuit for leading refrigerant liquid from said second generator to said condenser, and means in said refrigerant liquid leading circuit for heating water.

5. An absorption refrigerating system according to claim 2, further comprising a valve in said second line for controlling the flow of said refrigerant liquid to said generator, a circuit for leading refrigerant liquid from said second generator to said condenser, and means in said last mentioned refrigerant liquid leading circuit for heating water.

6. An absorption refrigerating system according to claim 2, further comprising means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle.

7. An absorption refrigerating system according to claim 2, further comprising a valve in said second line for controlling the flow of said refrigerant liquid to said generator, and means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle.

8. An absorption refrigerating system according to claim 2, further comprising a circuit for leading refrigerant liquid from said second generator to said condenser, means in said refrigerant liquid leading circuit for heating water, and means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle.

9. An absorption refrigerating system according to claim 2, further comprising a valve in said second line for controlling the flow of said refrigerant liquid to said generator, a circuit for leading refrigerant liquid from said second generator to said condenser, means in said refrigerant liquid leading circuit for heating water, and means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle.

10. An absorption refrigerating system according to claim 1, further comprising a valve in said second line for controlling the flow of said refrigerant liquid to said generator.

11. An absorption refrigerating system according to claim 1, further comprising means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle.

12. An absorption refrigerating system according to claim 1, further comprising means for switching the operation of said system from a room cooling cycle to a room heating cycle, said switching means including a valve operable to permit the flow of a mixture of the refrigerant vapor and solution through a line extending from said separator to said absorber wherein said mixture is divided into solution and refrigerant vapor which is then directed to said evaporator for effecting said room heating cycle, and a valve in said second line for controlling the flow of said refrigerant liquid to said generator.

References Cited

UNITED STATES PATENTS 3,292,385  12/1966  Murray _____ 62—159X
2,709,346  5/1955   Shagaloff _____ 165—63X WILLIAM E. WAYNER, Primary Examiner U.S. Cl. X.R.

62—476; 165—63